United States Patent
Rong et al.

(10) Patent No.: US 9,031,903 B2
(45) Date of Patent: May 12, 2015

(54) METHOD AND SYSTEM FOR PROVIDING NETWORK BASED TRANSACTION METRICS

(75) Inventors: Ruowen Rong, Holliston, MA (US);
Lingrong Chen, Shrewbury, MA (US);
Gang Fu, Shrewsbury, MA (US)

(73) Assignee: Verizon Patent and Licensing Inc., Basking Ridge, NJ (US)

(*) Notice: Subject to any disclaimer, the term of this patent is extended or adjusted under 35 U.S.C. 154(b) by 480 days.

(21) Appl. No.: 11/496,090

(22) Filed: Jul. 31, 2006

(65) Prior Publication Data

US 2008/0027962 A1    Jan. 31, 2008

(51) Int. Cl.
*G06F 7/00* (2006.01)
*G06Q 30/02* (2012.01)

(52) U.S. Cl.
CPC ...................................... *G06Q 30/02* (2013.01)

(58) Field of Classification Search
None
See application file for complete search history.

(56) References Cited

U.S. PATENT DOCUMENTS

| | | | | |
|---|---|---|---|---|
| 5,710,887 A | * | 1/1998 | Chelliah et al. | 705/26.62 |
| 5,809,144 A | * | 9/1998 | Sirbu et al. | 705/53 |
| 5,982,865 A | * | 11/1999 | Creamer et al. | 379/116 |
| 6,385,595 B1 | * | 5/2002 | Kolling et al. | 705/40 |
| 6,591,228 B1 | | 7/2003 | Hall et al. | |
| 6,615,258 B1 | * | 9/2003 | Barry et al. | 709/223 |
| 6,639,975 B1 | * | 10/2003 | O'Neal et al. | 379/112.01 |
| 6,931,382 B2 | * | 8/2005 | Laage et al. | 705/67 |
| 7,107,242 B1 | * | 9/2006 | Vasil et al. | 705/39 |
| 2002/0103753 A1 | * | 8/2002 | Schimmel | 705/39 |
| 2002/0194126 A1 | * | 12/2002 | Randell et al. | 705/40 |
| 2003/0009402 A1 | * | 1/2003 | Mullen et al. | 705/35 |
| 2003/0055808 A1 | | 3/2003 | Bhat | |
| 2003/0229590 A1 | * | 12/2003 | Byrne et al. | 705/40 |
| 2005/0080661 A1 | | 4/2005 | Casati et al. | |
| 2006/0229974 A1 | * | 10/2006 | Keithley et al. | 705/38 |

OTHER PUBLICATIONS

Moeller, et al., "End-to-End e-business Transaction Management Made Easy", IBM Redbooks, 1st ed., Dec. 2003, pp. 1-108, Dec. 1, 2003.

* cited by examiner

*Primary Examiner* — Debbie Le
*Assistant Examiner* — Hasanul Mobin

(57) ABSTRACT

An approach is provided for metrics data collection for business transactions. An online activity (e.g., Application Programming Interface (API) call) associated with a business flow is identified. It is determined whether the online activity is a part of a transaction, wherein the transaction is defined according to a business rule. Status of the transaction is updated if the online activity is a part of the transaction.

22 Claims, 8 Drawing Sheets

Verizon | Metrics - Download Center - Microsoft Internet Explorer

Close window

To download, please select the following criteria

Select Login ID (optional) Lookup — 501a

Select time
From (MM-DD-YYYY) [09-10-2002]
To (MM-DD-YYYY) [09-16-2002] — 501b

Select User Type
[Both ▼] — 501c

Select Customer (one or more)
[all]
Customer 1
Customer 2
Customer 3
...
Customer n — 501d

Select data category (one or more)
☑ User Activity
☐ Account Management
☐ Ordering
☐ Billing
☐ Repair — 501e

[SUBMIT] — 501f

METHOD AND SYSTEM FOR PROVIDING NETWORK BASED TRANSACTION METRICS

BACKGROUND INFORMATION

Given the volume of commerce transacted over the global Internet, online service providers need to ensure that business transactions are accurately captured and reported. Traditionally, metrics of an online service provider have been collected and calculated by tracking the number of clicks on certain web pages or by counting internal function calls. However, for a complicated business transaction, these methods lack accuracy in that not all clicks or function calls can be attributable to a true transaction. Namely, the click can simply be an action that does not result in a completed transaction, resulting in a "false positive" of a business transaction.

Therefore, there is a need for an approach that can accurately determine occurrences of true business transactions.

BRIEF DESCRIPTION OF THE DRAWINGS

The present invention is illustrated by way of example, and not by way of limitation, in the figures of the accompanying drawings and in which like reference numerals refer to similar elements and in which:

FIGS. 5A and 5B are graphical user interfaces (GUIs) for providing exemplary functions of the metrics portal utilized in the system of FIG. 1, according to an embodiment of the present invention.

DESCRIPTION OF PREFERRED EMBODIMENTS

An apparatus, method, and software for providing accurate metrics of transactions are described. In the following description, for the purposes of explanation, numerous specific details are set forth in order to provide a thorough understanding of the present invention. It is apparent, however, to one skilled in the art that the present invention may be practiced without these specific details or with an equivalent arrangement. In other instances, well-known structures and devices are shown in block diagram form in order to avoid unnecessarily obscuring the present invention.

Although the various embodiments of the present invention are described with respect to Application Programming Interface (API) calls, it is contemplated that these embodiments have applicability to other equivalent software interfaces and operations.

Figure 1:
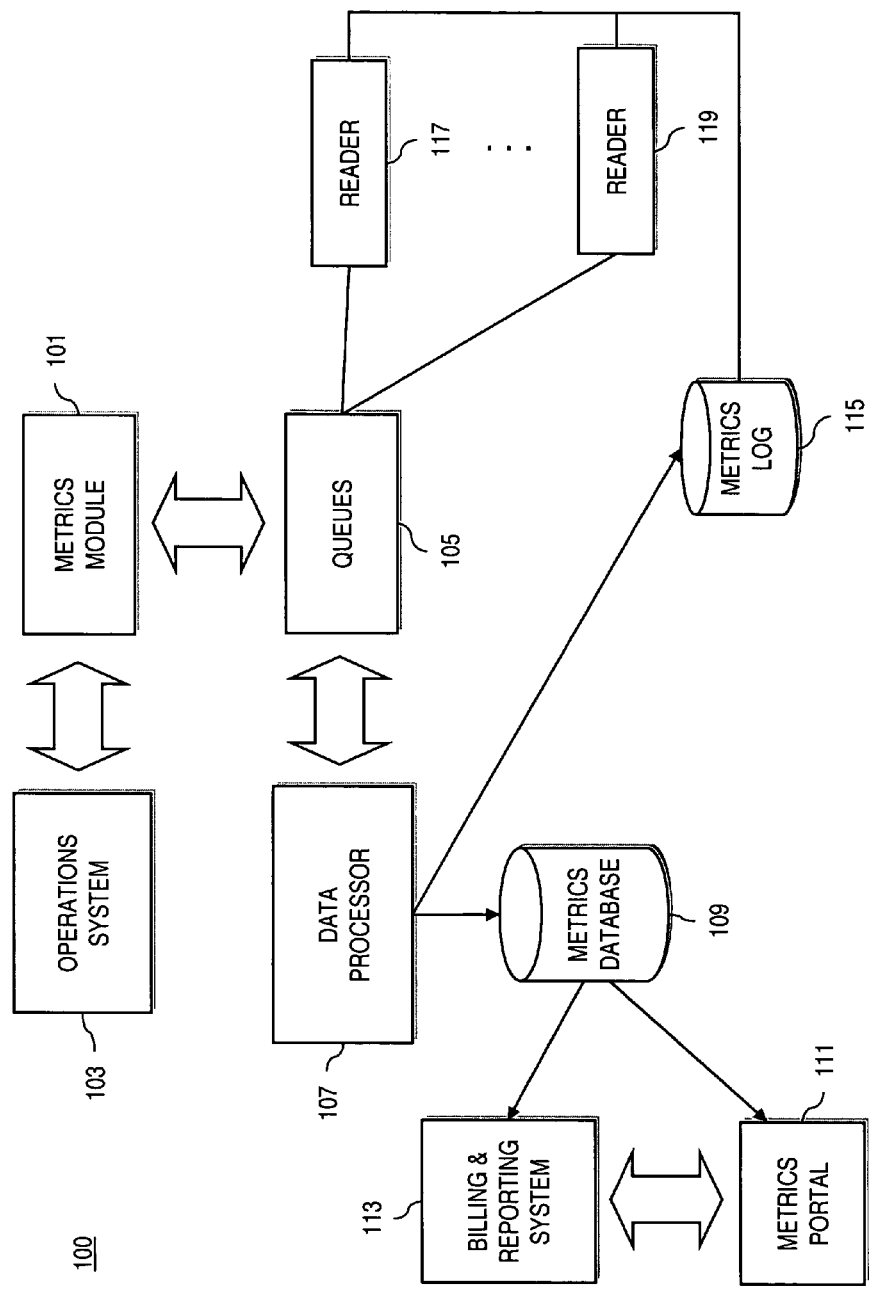
FIG. 1 is a diagram of a system for providing network based transaction metrics, according to one embodiment of the present invention.

FIG. 1 is a diagram of a system for providing network based transaction metrics, according to one embodiment of the present invention. The system 100 utilizes a metrics module 101 (or processor) to determine activities and transactions generated, for instance, by an operations system 103 in the course of providing online services. The metrics module 101 determines online transactions by integrating business logic into the metrics data collection process. The business logic employs user specified rules to define a transaction based on one or more activities supporting a business flow. Activities can involve a sequence of clicks on the web pages and a series of internal function calls. As such, the metrics module 101 can track real or true business transactions performed and completed online, thereby ensuring that the transaction metrics are accurate. Although the metrics module 101 is shown as a standalone component, this module or processor 101 can be a part of another computing system—e.g., a network management system (not shown).

The metrics module 101 generates metrics logs and places them in multiple message queues 105, which can enable parallel processing of the logs. The queues 105 feed the information to a data processor 107 for messaging (and/or converting) raw data associated with the collected metrics; the resultant data is stored in a metrics database 109. It is contemplated that the system 100 enables gathering of data from different sources and database tables, in which the collected data is processed and stored the metrics database 109 for presentation. In terms of history and persistence, the metrics database 109 can store current interactions as well as a predetermined duration worth of interactions (e.g., 12 months).

In one embodiment, the data stored within the metrics database 109 are made available for presentation via an online portal 111 (denoted as "metrics portal"). Additionally, a billing and reporting system 113 can retrieve metrics information within the metrics database 109 for generating invoices and/or reports. Further, a metrics log 115 is maintained by the data processor 107 and is accessible to readers 117, 119, which are coupled to the queues 105.

Figure 2:
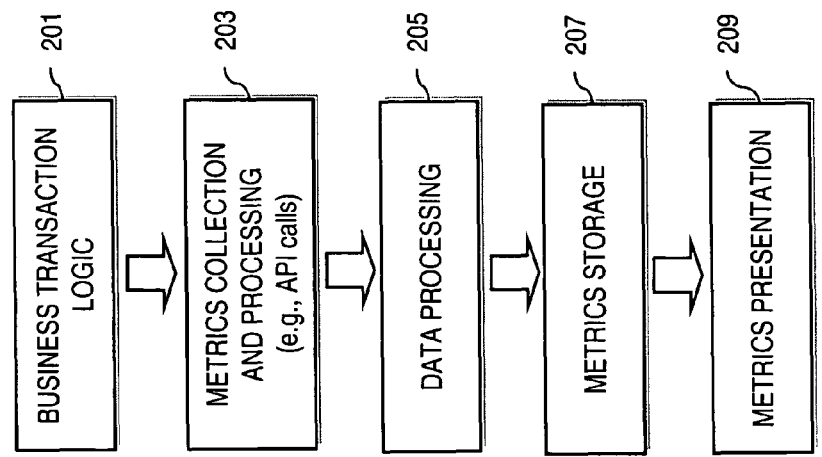
FIG. 2 is a functional diagram of the system of FIG. 1, according to one embodiment of the present invention.

FIG. 2 is a functional diagram of the system of FIG. 1, according to one embodiment of the present invention. Under the system 100, applications within the operations system 103 can utilize the metrics module 101 to have their corresponding transactions and activities recorded in the metrics database 109. For example, the recorded information includes the type of transaction, the status of the transaction, the actor of the transaction and the time stamp. The logged information may be used to make queries into another database (not shown), to gather further data, and the completed outcome is then be stored in the metrics database 109 after the data have been processed and classified into different categories, such ordering, repair, billing and account management.

To provide network based metrics tracking, the system 100 provides the following functions: business transaction logic 201, metrics collection and processing 203 (which can be based on Application Programming Interface (API) calls), data processing 205, metrics storage 207, and metrics presentation 209. As mentioned, the business transaction logic 201 applies a predefined set of rules or conditions, e.g., business rules, to determine occurrence of a transaction. The term "business rule" refers to defining rules according to business behavior or procedure, in which the resultant data is captured in real time. For example, a business rule can specify that only activities involving a certain dollar amount are tracked according to one duration, and activities of a different dollar amount are tracked based on another duration.

As used herein, the term "online transaction" is distinct from "online activity." An activity, in an exemplary embodiment, can be an API call. A transaction can be a real business transaction made up of one or more activities—e.g., one or more API calls. In an exemplary embodiment, a list of predefined transactions is maintained. These transactions can be attributed with a "real" business meaning, and be logged for real-time and future reporting. For example, a business transaction can involve one or more API calls, in which the transaction starts with the first API call and ends with the last API call. Additionally, transactions can be related; e.g., there could be a parent transaction and a child transaction.

With respect to the data processing function 205, the specific operation of this function 205 depends on the application and can include filtering, messaging, formatting, retrieval and correlation with other information, etc.

Figure 3A:
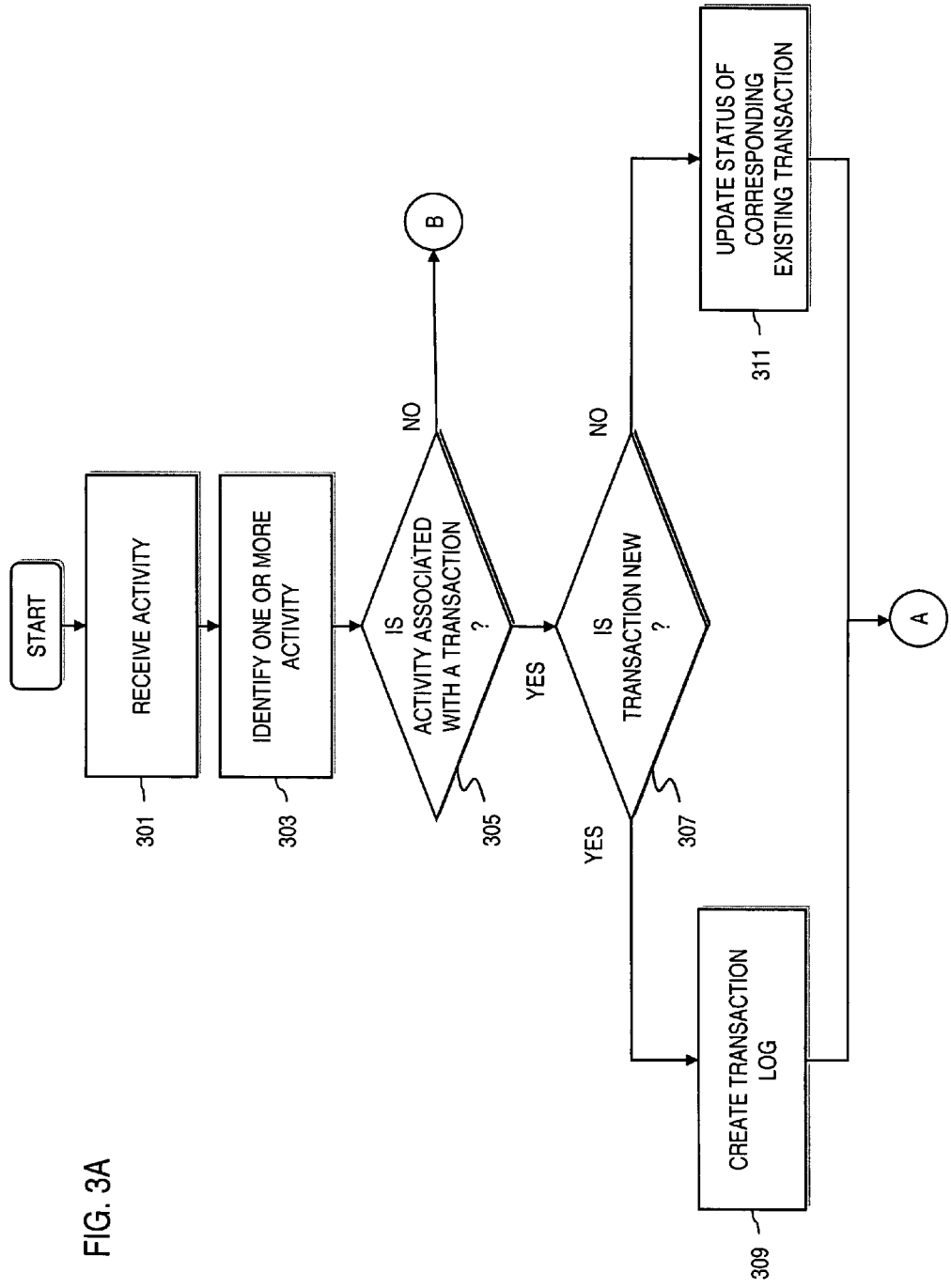
FIGS. 3A and 3B are flowcharts of a process for providing network based transaction metrics, according to one embodiment of the present invention.
Figure 3B:
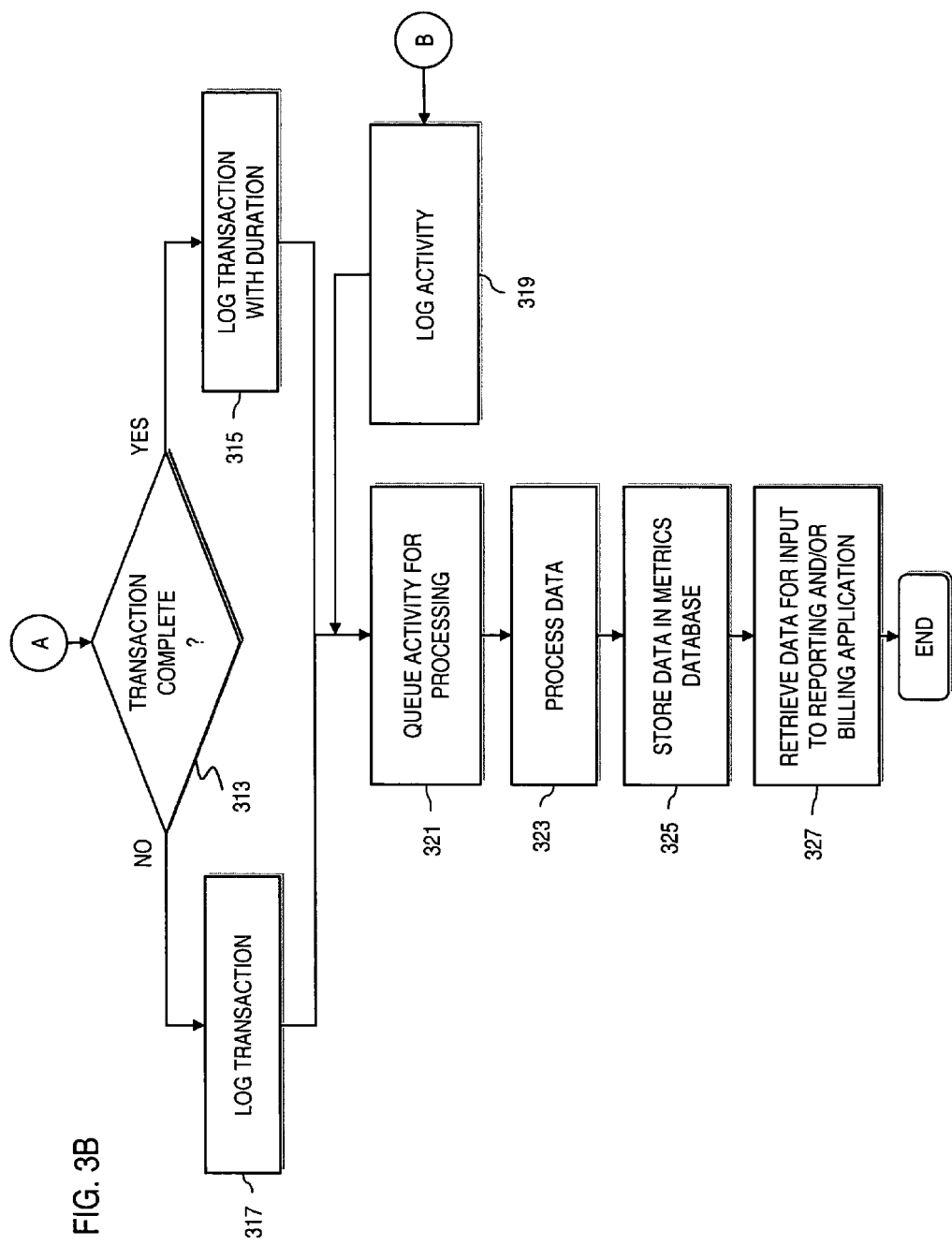

FIGS. 3A and 3B are flowcharts of a process for providing network based transaction metrics, according to one embodiment of the present invention. By way of illustration, the metrics process is described with respect to activities defined by Application Programming Interface (API) calls. A typical application can produce a tremendous number of API calls, which can be in the thousands. A user or a process begins an online transaction by initiating an online activity, such as an API call. In steps 301 and 303, an activity is received and identified (or otherwise detected); that is, an API calls the metrics module 101. In this metrics process, each API is logged as an activity. In step 305, the process determines whether the activity (e.g., API) is associated with a transaction; if yes, the process next checks whether the activity is associated with a new transaction (step 307). If so, a transaction log is created, as in step 309. If it is not a new transaction, meaning that the same transaction log has been created and the transaction is in process, the transaction status is updated, per step 311. Status information for a particular transaction can include, for instance, the following: In Progress (i.e., transaction has started but not completed), Complete (i.e., all activities associated with the transaction has been performed), Aborted (i.e., the transaction has been canceled by the user or process), or Failed (i.e., one or more activities cannot be properly performed).

Thereafter, the metrics process determines whether the transaction is completed (step 313), the transaction as well as the duration of the transaction are logged, as in step 315. If the transaction is not complete, then the transaction is simply logged (step 317).

With respect to determining whether the activity is associated with a transaction, as determined in step 305, the process proceeds to log the activity, as in step 319, if the activity does not correspond to any transaction.

In certain embodiments, the metrics process (or transaction tracking) is an asynchronous process. That is, the metrics process can be a background process and is independent from the business flow—i.e., a series of transactions and/or activities supporting a business objective or function. Hence, the business transaction need not wait for the metrics log to finish to move on to the next step, thereby not impacting the execution and performance of the business flow. The metrics logs are sent to multiple message queues (parallel processing), then the data processor 107 processes the message and saves them to the metrics database 109 (steps 321, 323 and 325).

In step 327, the data within the metrics database 109 can be retrieved by a billing and/or reporting application. Alternatively, the data is made accessible by the metrics portal 111, as explained earlier.

Figure 4:
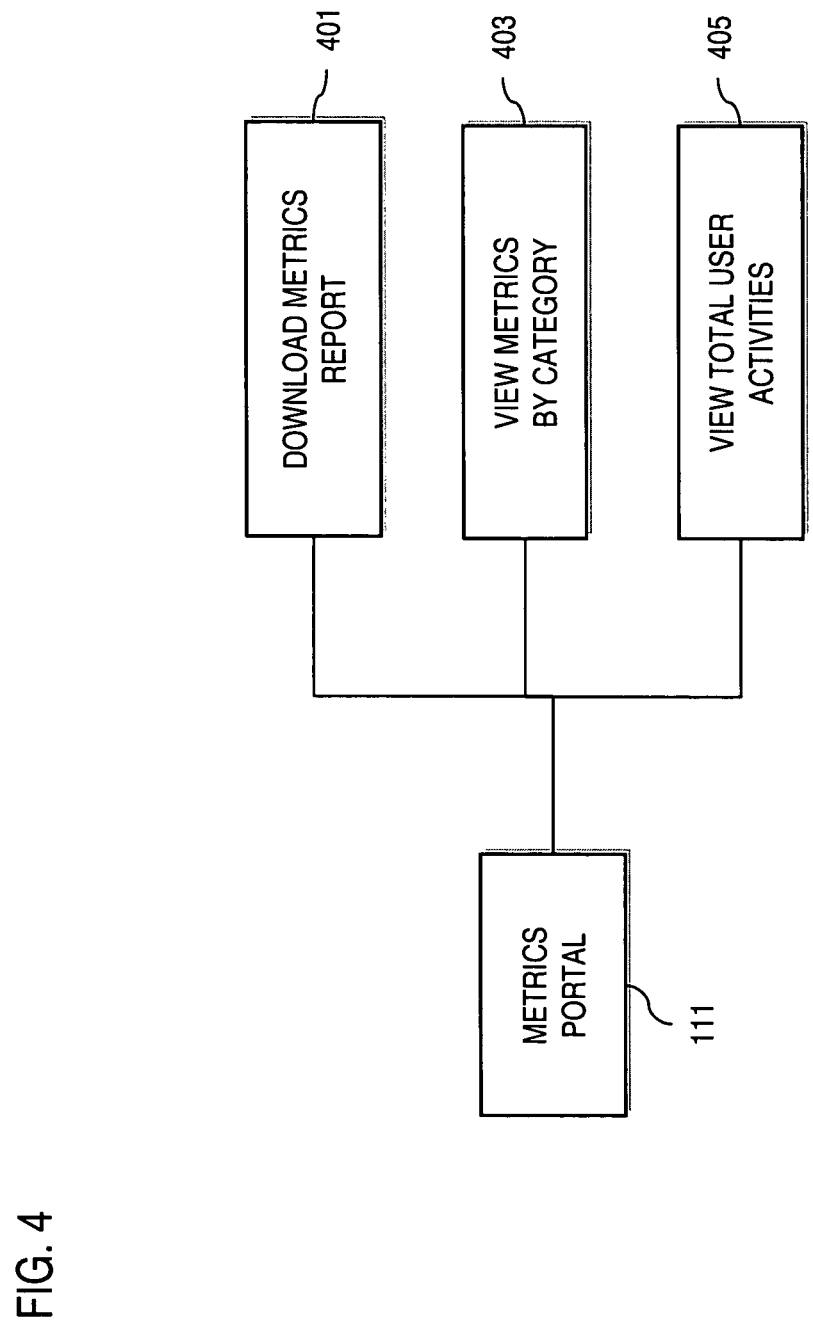
FIG. 4 is a functional diagram of the metrics portal utilized in the system of FIG. 1, according to an embodiment of the present invention.

FIG. 4 is a functional diagram of the metrics portal utilized in the system of FIG. 1, according to an embodiment of the present invention. The metrics portal 111 provides a mechanism for presenting the metrics data resident in the metrics database 109. By way of example, the portal 111 can supply users (e.g., customers, or service provider account representatives) with the capability to select products and services of a service provider, to initiate orders, review billing inquiries, report network trouble and inquire on status. In this manner, the metrics data allows the representatives to view the current and the history of these interactions. The transactions on the portal 111 can be automatically recorded, processed and stored in the metrics database 109. Moreover, non-transaction activities can also recorded in the metrics database 109.

The metrics portal 111 can thus provide statistical information and graphical representations of a user's usage on the portal 111, thereby permitting viewing of information, gauging performance and measuring business activity. To obtain account information, a customer profile database (not shown) can be utilized. The customer profile database can include, for example, a customer profile, a hierarchy of subscriptions, and subscribers. The customer profile database can be used to relate each transaction and activity on the portal to the user and the user's associated organization. Also, a user group hierarchy provides for the ability to categorize all related transactions and activities under each level of the hierarchy.

As shown in the site map of FIG. 4, the metrics portal 111 provides for the following functions: download metrics report 401, view metrics by category 403, and view total user activities 405. The metrics portal 111 provides, in an exemplary embodiment, a graphical user interface (GUI) to support the above functions, as next described.

Figure 5B:
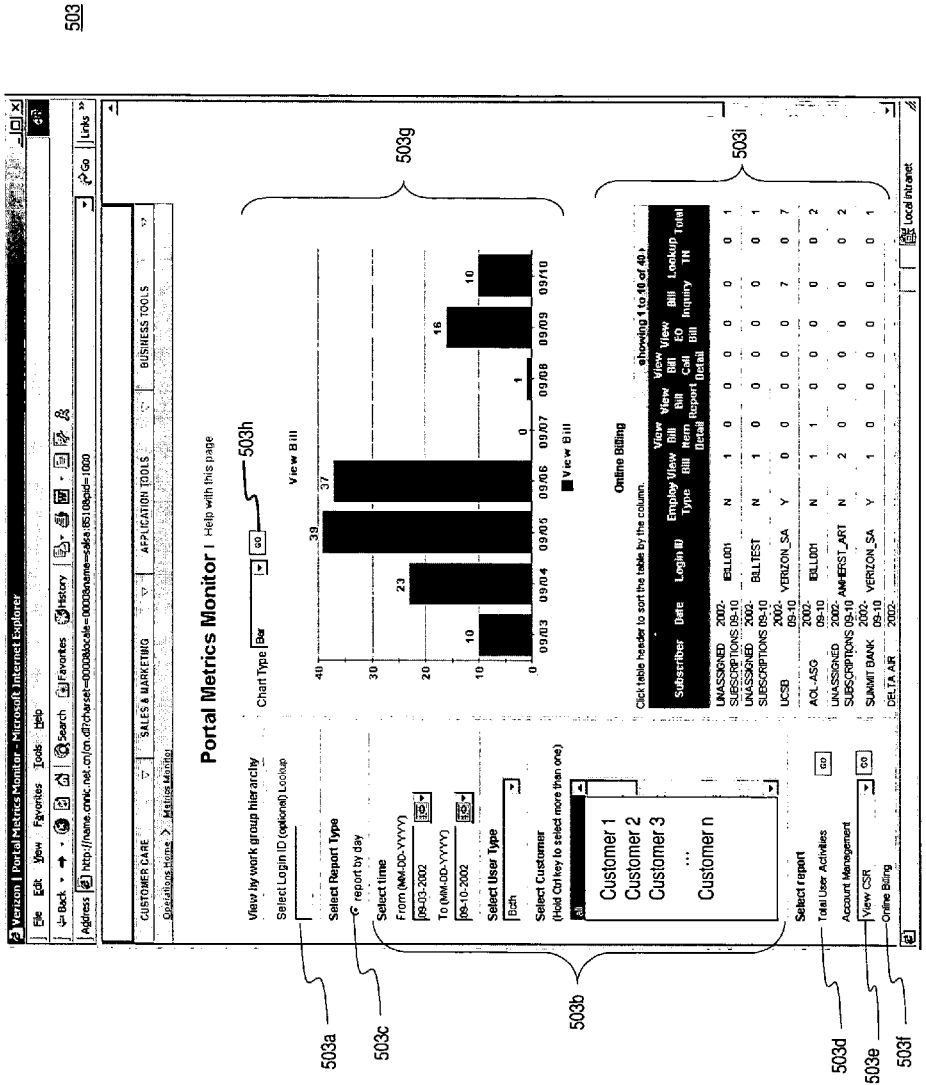

FIGS. 5A and 5B are graphical user interfaces (GUIs) for providing exemplary functions of the metrics portal utilized in the system of FIG. 1, according to an embodiment of the present invention. As seen in FIG. 5A, the GUI 501 provides the user with the capability to download a metrics report. This download GUI 501 includes an optional textbox 501a for a Login ID (identification) for access to reports. Date range textboxes 501b permit the user to specify the start date and end date for the report. Also, user type can be selected via textbox 501c. The GUI 501 further provides a textbox 501d to allow for selection of the customer of interest. The user is also permitted to select a data category using the boxes 501e: User Activity, Account Management, Ordering, Billing and Repair. Upon completion of specifying the report criteria, the user can then submit the request using a Submit button 501f.

With this GUI 501, the combination of the user's login ID and a list of the user's customers provides for restricting the data made available to the user. Namely, only the metrics relevant to the customers of the logged in user are presented. The users can download the metrics report in any number of formats, e.g., MICROSOFT™ EXCEL.

Under the scenario of FIG. 5A, once the user selects the time period, customer(s), and type of report, and requests a download, the metrics portal 111 gathers and formats all the requested data. Then, the metrics portal 111 can then send the file to a pre-designated server (not shown), which can then make the file available online and send a notification, e.g., via email, to the user along with a Uniform Resource Locator (URL) address of the file. This URL allows the user to view the downloaded file and to save it.

FIG. 5B shows a GUI 503 that presents a billing metrics report, for example. This GUI 503 provides similar boxes 503a and 503b as that of the GUI 501. In addition, the user can specify the report type via a button 503c. Buttons 503d, 503e, and 503f provide the user with the capability to select the following exemplary reports: Total User Activities report; Account Management report; and an Online Billing report.

In addition, a graph 503g can be presented to reflect the selected report. Textbox 503h provides for selection of the type of graph, such as a bar graph, pie chart, etc.

Furthermore, table 503i can enumerate online billing information. In this example, the online service relates to telephony services, thus, the table includes the following fields:

subscriber, date, Login ID, Employee Type, View Bill, View Bill Item Detail, View Bill Report, View Bill Call Detail, View EO Bill, Bill Inquiry, Lookup TN (Telephone Number), and Total.

According to one embodiment of the present invention, the metrics portal 111 provides a transaction view (or report) or an activity view. A transaction is a specific action that is characterized by a defined sequence of steps the user performs on the portal 111 to complete the action. An activity is the set of flowthrough or legacy API calls the system generates to process the transaction the user completes on the portal 111. Generally, the specific sequence of steps required to perform a transaction on the portal remain the same regardless of the legacy systems or geographic area the transaction involves. Conversely, the set of flowthrough or legacy API calls the activity requires to execute the transaction will vary according to the legacy system and geographic area the transaction involves. Because there is a defined sequence of steps involved in each transaction, in contrast to the activities that execute the transaction, the transaction view or report is a more accurate measure of portal activity, work functionality and productivity.

The Activity View displays API call statistics for each transaction (online business transaction).

In addition to the GUIs 501 and 503, the metrics portal 111 can provide a report based on a work group hierarchy, whereby the workgroups can be represented in a condensed view and exploded upon selection to reveal members of the selected workgroup. All activities and/or transactions corresponding to members of the selected workgroup will be provided in the report.

Furthermore, the metrics portal 111 can list predefined reports for selection by the user. These predefined reports can include reports on the active customer users and active online service provider representative users.

The processes described herein for providing metrics tracking may be implemented via software, hardware (e.g., general processor, Digital Signal Processing (DSP) chip, an Application Specific Integrated Circuit (ASIC), Field Programmable Gate Arrays (FPGAs), etc.), firmware or a combination thereof. Such exemplary hardware for performing the described functions is detailed below.

Figure 6:
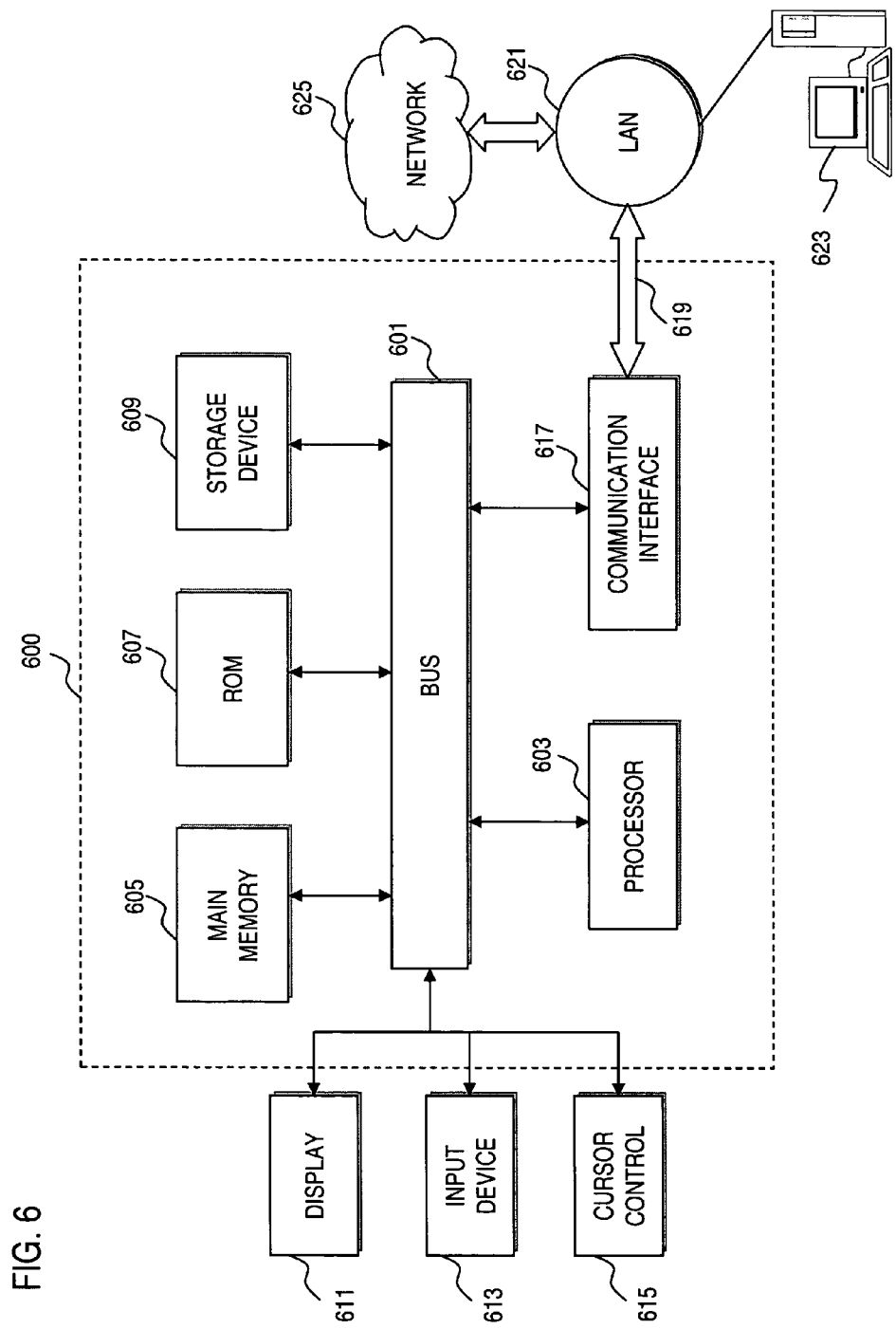
FIG. 6 is a diagram of a computer system that can be used to implement various embodiments of the present invention.

FIG. 6 illustrates a computer system 600 upon which an embodiment according to the present invention can be implemented. For example, the processes described herein can be implemented using the computer system 600. The computer system 600 includes a bus 601 or other communication mechanism for communicating information and a processor 603 coupled to the bus 601 for processing information. The computer system 600 also includes main memory 605, such as a random access memory (RAM) or other dynamic storage device, coupled to the bus 601 for storing information and instructions to be executed by the processor 603. Main memory 605 can also be used for storing temporary variables or other intermediate information during execution of instructions by the processor 603. The computer system 600 may further include a read only memory (ROM) 607 or other static storage device coupled to the bus 601 for storing static information and instructions for the processor 603. A storage device 609, such as a magnetic disk or optical disk, is coupled to the bus 601 for persistently storing information and instructions.

The computer system 600 may be coupled via the bus 601 to a display 611, such as a cathode ray tube (CRT), liquid crystal display, active matrix display, or plasma display, for displaying information to a computer user. An input device 613, such as a keyboard including alphanumeric and other keys, is coupled to the bus 601 for communicating information and command selections to the processor 603. Another type of user input device is a cursor control 615, such as a mouse, a trackball, or cursor direction keys, for communicating direction information and command selections to the processor 603 and for controlling cursor movement on the display 611.

According to one embodiment of the invention, the processes described herein are performed by the computer system 600, in response to the processor 603 executing an arrangement of instructions contained in main memory 605. Such instructions can be read into main memory 605 from another computer-readable medium, such as the storage device 609. Execution of the arrangement of instructions contained in main memory 605 causes the processor 603 to perform the process steps described herein. One or more processors in a multi-processing arrangement may also be employed to execute the instructions contained in main memory 605. In alternative embodiments, hard-wired circuitry may be used in place of or in combination with software instructions to implement the embodiment of the present invention. Thus, embodiments of the present invention are not limited to any specific combination of hardware circuitry and software.

The computer system 600 also includes a communication interface 617 coupled to bus 601. The communication interface 617 provides a two-way data communication coupling to a network link 619 connected to a local network 621. For example, the communication interface 617 may be a digital subscriber line (DSL) card or modem, an integrated services digital network (ISDN) card, a cable modem, a telephone modem, or any other communication interface to provide a data communication connection to a corresponding type of communication line. As another example, communication interface 617 may be a local area network (LAN) card (e.g. for Ethernet™ or an Asynchronous Transfer Model (ATM) network) to provide a data communication connection to a compatible LAN. Wireless links can also be implemented. In any such implementation, communication interface 617 sends and receives electrical, electromagnetic, or optical signals that carry digital data streams representing various types of information. Further, the communication interface 617 can include peripheral interface devices, such as a Universal Serial Bus (USB) interface, a PCMCIA (Personal Computer Memory Card International Association) interface, etc. Although a single communication interface 617 is depicted in FIG. 6, multiple communication interfaces can also be employed.

The network link 619 typically provides data communication through one or more networks to other data devices. For example, the network link 619 may provide a connection through local network 621 to a host computer 623, which has connectivity to a network 625 (e.g. a wide area network (WAN) or the global packet data communication network now commonly referred to as the "Internet") or to data equipment operated by a service provider. The local network 621 and the network 625 both use electrical, electromagnetic, or optical signals to convey information and instructions. The signals through the various networks and the signals on the network link 619 and through the communication interface 617, which communicate digital data with the computer system 600, are exemplary forms of carrier waves bearing the information and instructions.

The computer system 600 can send messages and receive data, including program code, through the network(s), the network link 619, and the communication interface 617. In the Internet example, a server (not shown) might transmit requested code belonging to an application program for implementing an embodiment of the present invention through the network 625, the local network 621 and the communication interface 617. The processor 603 may execute the transmitted code while being received and/or store the code in the storage device 609, or other non-volatile storage for later execution. In this manner, the computer system 600 may obtain application code in the form of a carrier wave.

The term "computer-readable medium" as used herein refers to any medium that participates in providing instructions to the processor 603 for execution. Such a medium may take many forms, including but not limited to non-volatile media, volatile media, and transmission media. Non-volatile media include, for example, optical or magnetic disks, such as the storage device 609. Volatile media include dynamic memory, such as main memory 605. Transmission media include coaxial cables, copper wire and fiber optics, including the wires that comprise the bus 601. Transmission media can also take the form of acoustic, optical, or electromagnetic waves, such as those generated during radio frequency (RF) and infrared (IR) data communications. Common forms of computer-readable media include, for example, a floppy disk, a flexible disk, hard disk, magnetic tape, any other magnetic medium, a CD-ROM, CDRW, DVD, any other optical medium, punch cards, paper tape, optical mark sheets, any other physical medium with patterns of holes or other optically recognizable indicia, a RAM, a PROM, and EPROM, a FLASH-EPROM, any other memory chip or cartridge, a carrier wave, or any other medium from which a computer can read.

Various forms of computer-readable media may be involved in providing instructions to a processor for execution. For example, the instructions for carrying out at least part of the present invention may initially be borne on a magnetic disk of a remote computer. In such a scenario, the remote computer loads the instructions into main memory and sends the instructions over a telephone line using a modem. A modem of a local computer system receives the data on the telephone line and uses an infrared transmitter to convert the data to an infrared signal and transmit the infrared signal to a portable computing device, such as a personal digital assistant (PDA) or a laptop. An infrared detector on the portable computing device receives the information and instructions borne by the infrared signal and places the data on a bus. The bus conveys the data to main memory, from which a processor retrieves and executes the instructions. The instructions received by main memory can optionally be stored on storage device either before or after execution by processor.

In the preceding specification, various preferred embodiments have been described with reference to the accompanying drawings. It will, however, be evident that various modifications and changes may be made thereto, and additional embodiments may be implemented, without departing from the broader scope of the invention as set forth in the claims that flow. The specification and the drawings are accordingly to be regarded in an illustrative rather than restrictive sense.

What is claimed is:

1. A computer-implemented method, comprising:
identifying an online activity associated with a business flow;
determining, by a processor, whether the online activity is a part of a transaction,
wherein the transaction is defined according to a business rule,
wherein the transaction is characterized by a defined sequence of steps of a plurality of online activities that a user performs on a portal to complete an action, and the identified online activity is associated with the business rule if the identified online activity is one of the plurality of online activities and within the sequence,
wherein the defined sequence of steps include activities associated with one of portal activity, work functionality, work productivity or a combination thereof and are exclusive of activities for executing the transaction;
updating status of the transaction responsive to the determination that the online activity is a part of the transaction;
storing the activity log and the transaction log in a plurality of queues; and
processing the activity log, the plurality of queues and the transaction log to generate metrics data,
wherein the metrics data comprise at least a time period, customer information, and report type,
wherein the processing of the plurality of queues and the transaction log is performed in parallel to generate the metrics data,
wherein the report type is selected by a user and comprises one or more of Total User Activities, Account Management, and Online Billing.

2. The method according to claim 1, wherein the transaction log is modified with the updated status, the method further comprising:
updating an online activity log based on the identified online activity.

3. The method according to claim 1, wherein the metrics data is accessible via an online portal or a reporting system.

4. The method according to claim 1, wherein the online activity includes an Application Programming Interface (API) call.

5. The method according to claim 1, further comprising:
determining whether the transaction is new; and
creating a new transaction log for the new transaction.

6. The method according to claim 1, wherein the step of updating the status is asynchronous with the business flow.

7. A system, comprising:
a processor configured to identify an online activity associated with a business flow and to determine whether the online activity is a part of a transaction,
wherein the transaction is defined according to a business rule,
wherein the transaction is characterized by a defined sequence of steps of a plurality of online activities that a user performs on a portal to complete an action, and the identified online activity is associated with the business rule if the identified online activity is one of the plurality of online activities and within the sequence,
wherein the defined sequence of steps include activities associated with one of portal activity, work functionality, work productivity or a combination thereof and are exclusive of activities for executing the transaction,
wherein the processor is further configured to modify a transaction log with the updated status and to update an online activity log based on the identified online activity;
a plurality of queues configured to store the activity log and the transaction log; and
a data processor configured to process the activity log the of queues and the transaction log to generate metrics data, wherein the processor is further configured to update status of the transaction responsive to the determination that the online activity is a part of the transaction, wherein the processing of the plurality of queues and the transaction log is performed in parallel to generate the metrics data, wherein the metrics data comprise at least a time period, customer information, and report type, wherein the report type is selected by a user and comprises one or more of Total User Activities, Account Management, and Online Billing.

8. The system according to claim 7, wherein the metrics data is accessible via an online portal or a reporting system.

9. The system according to claim 7, wherein the online activity includes an Application Programming Interface (API) call.

10. The system according to claim 7, wherein the processor is further configured to determine whether the transaction is new, and to create a new transaction log for the new transaction.

11. The system according to claim 7, wherein the updating of the status is asynchronous with the business flow.

12. A method, comprising:

retrieving metrics data from a database in response to a request from a user; and presenting the metrics data to the user, wherein metrics data corresponds to a transaction that is defined by a business rule to include one or more online activities, the metrics data comprising at least a time period, customer information, and report type, wherein the metrics data is associated with a processing of an activity log, a plurality of queues and a transaction log to generate the metrics data, wherein the processing of the plurality of queues and the transaction log has been performed in parallel to generate the metrics data, wherein the transaction is characterized by a defined sequence of steps of a plurality of online activities that a user performs on a portal to complete an action, and the one or more online activities are associated with the business rule if the one or more online activities are at least one of the plurality of online activities and within the sequence, wherein the defined sequence of steps include activities associated with one of portal activity, work functionality, work productivity or a combination thereof and are exclusive of activities for executing the transaction, wherein the report type is selected by a user and comprises one or more of Total User Activities, Account Management, and Online Billing.

13. The method according to claim 12, wherein the one or more activities are maintained in an online activity log.

14. The method according to claim 12, wherein the online activity includes an Application Programming Interface (API) call.

15. The method according to claim 12, wherein the metrics data is used to generate a report on a real-time basis.

16. An apparatus, comprising:

a processor configured to retrieve metrics data from a database in response to a request from a user; and a graphical user interface configured to present the metrics data to the user, wherein metrics data corresponds to a transaction that is defined by a business rule to include one or more online activities, the metrics data comprising at least a time period, customer information, and report type, wherein the metrics data is associated with a processing of an activity log, a plurality of queues and a transaction log to generate the metrics data, wherein the processing of the plurality of queues and the transaction log has been performed in parallel to generate the metrics data, wherein the transaction is characterized by a defined sequence of steps of a plurality of online activities that a user performs on a portal to complete an action, and the one or more online activities are associated with the business rule if the one or more online activities are at least one of the plurality of online activities and within the sequence, wherein the defined sequence of steps include activities associated with one of portal activity, work functionality, work productivity or a combination thereof and are exclusive of activities for executing the transaction, wherein the report type is selected by a user and comprises one or more of Total User Activities, Account Management, and Online Billing.

17. The apparatus according to claim 16, wherein the one or more activities are maintained in an online activity log.

18. The apparatus according to claim 16, wherein the online activity includes an Application Programming Interface (API) call.

19. The apparatus according to claim 16, wherein the metrics data is used to generate a report on a real-time basis.

20. The method according to claim 1, wherein the metrics data further comprise a type of transaction, status of the transaction, the actor of the transaction and a time stamp associated with the transaction.

21. The method according to claim 1, wherein the user selects a manner of displaying the report type.

22. The method according to claim 21, wherein the report type is displayed as a graph and the user selects either a bar graph or a pie chart display.

* * * * *